United States Patent Office 3,261,835
Patented July 19, 1966

3,261,835
POLYSUBSTITUTED AMINO-s-TRIAZINES
Philip C. Hamm, Webster Groves, and Angelo John Speziale, Kirkwood, Mo., assignors to Monsanto Company, St. Louis, Mo., a corporation of Delaware
No Drawing. Filed Jan. 19, 1959, Ser. No. 787,380
2 Claims. (Cl. 260—249.8)

This invention relates to herbicidal compositions and methods for their use. More particularly this invention relates to new active chemical compounds having contact herbicidal activity which are near homologues of compounds having virtually no herbicidal activity.

The primary purpose of this invention is to provide a new class of chemical compounds including methods for their preparation. A further purpose of this invention is to provide a new and useful class of general contact herbicides and methods for their use. Still further purposes of this invention will be apparent from the following disclosure.

In accordance with this invention it has been discovered that compounds of the following structure are useful herbicides

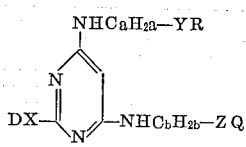

where X, Y and Z are either sulfur or oxygen, $a$ and $b$ are integers from 1 to 6, and D, R and Q are alkyl groups having from 1 to 8 carbon atoms.

Compounds contemplated by this invention include:

2-methylthio-4,6-bis(3-methoxypropylamino)-s-triazine
2-ethoxy-4,6-bis(6-butylthiohexylamino)-s-triazine
2-propoxy-4,6-bis(octoxymethylamino)-s-triazine
2-hexoxy-4,6-bis(4-pentoxybutylamino)-s-triazine
2-methoxy-4,6-bis(butylthiomethylamino)-s-triazine
2-methylthio-4,6-bis(4-n-butoxypropylamino)-s-triazine
2-octoxy-4,6-bis(6-ethoxyhexylamino)-s-triazine
2-butoxy-4,6-bis(ethylthiomethylamino)-s-triazine
2-octoxy-4,6-bis(3-octylthiopropylamino)-s-triazine
2-octylthio-4,6-bis(5-butoxyamylamino)-s-triazine
2-butylthio-4,6-bis(2-octoxyethylamino)-s-triazine
2-heptoxy-4,6-bis(3-octylthiopropropylamino)-s-triazine
2-methylthio-4,6-bis(4-heptoxybutylamino)-s-triazine,
and the like.

Further details with respect to the preparation of these new compounds are set forth in the following examples.

The new class of compounds of this invention can be prepared by the reaction of a 2-chloro-4,6-bis(alkoxyalkylamino)-s-triazine or corresponding 2-chloro-4,6-bis-(alkylthioalkylamino)-s-triazine with sodium alkoxide or sodium mercaptide derived from metallic sodium and the desired alcohol. The reaction is conducted at temperatures above 20° C. and preferably under reflux conditions, which usually means a temperature of 50–100° C. for a period of 2 to 3 hours.

The product usually consists of a colorless oil from which the alcohol is removed by evaporation. This product is then dissolved in a suitable solvent, filtered, and the solvent evaporated leaving a colorless oil which is obtained in almost quantative yield. It is apparent that certain variations may be made, for example, in the temperatures employed depending upon the particular triazine and alcohol or mercaptan used. In addition it is evident that the alkoxides of lithium, cesium, and potassium may be used.

If the corresponding thio compound is desired then at least a stoichiometric amount of the thiol counterpart of the alcohol is used as a reactant in the presence of a suitable solvent such as an alcohol.

Further details of the use and preparation of the compounds are set forth in the following examples:

EXAMPLE I 2-methoxy-4,6-bis(3-methoxypropylamino)-s-triazine

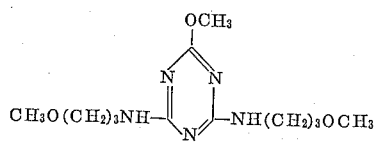

To a solution of sodium methoxide in methanol (1.17 g. of sodium in 50 ml. of methanol), there is added 8.5 g. (0.0294 mole) of 2-chloro-4,6-bis(3-methoxypropylamino)-s-triazine. The mixture is heated under reflux (65° C.) for 2 hours, cooled and filtered to remove sodium chloride. After the removal of the methanol by distillation, the residue is dissolved in ether and filtered. There is obtained 7.4 g. (88%) yield of the desired product after removal of the ether by distillation. $N_D^{25}$ 1.5229.
*Analysis.*—Calcd.: C=50.51; H=8.12; N=24.55. Found: C=50.36; H=7.48; N=24.57.

EXAMPLE II 2-butoxy-4,6-bis(3-methoxypropylamino)-s-triazine

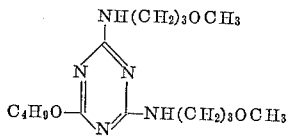

To a solution of sodium butoxide in butanol (1.15 g. of metallic sodium and 100 ml. butanol), there is added 14.5 g. (0.05 mole) of 2-chloro-4,6-bis(3-methoxypropylamino)-s-triazine. The mixture is heated at 80–95° C. for 4 hours, cooled and poured into water. The organic layer is separated and the solvent is removed. The solid residue is recrystallized from hexane. There is obtained 12 g. (73.5% yield) of the desired product melting at 67–68° C.
*Analysis.*—Calc.: N=21.39. Found: N=21.54.

EXAMPLE III 2-methoxy-4,6-bis(3-n-butoxypropylamino)-s-triazine

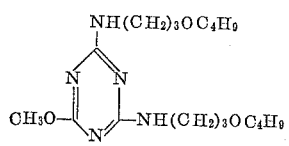

To a solution of sodium methoxide in methanol (prepared from 1.15 g. of sodium and 100 ml. of methanol) there is added 19.7 g. (0.05 mole) of 2-chloro-4,6-bis-3-n - butoxypropylamino) - s-triazine. The mixture is heated at reflux (66° C.) for 3 hours, cooled and poured into water. The product is removed by extraction with ether. The ether solution is dried with anhydrous magnesium sulfate and the solvent is then evaporated. There is obtained 18.1 g. (98% yield) of the desired product as a clear colorless oil.

*Analysis.*—Calc.: N=18.96. Found: N=19.10.

EXAMPLE IV

*2-ethylthio-4,6-bis(3-methoxypropylamino)-s-triazine*

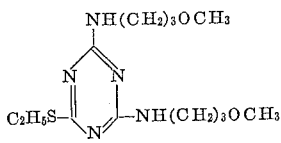

A solution of sodium ethyl mercaptide is prepared from 1.6 g. of sodium, 100 ml. of ethanol and 6.2 g. (0.10 mole) of ethyl mercaptan. To this is added 14.5 g. (0.05 mole) of 2-chloro-4,6-bis(3-methoxypropylamino)-s-triazine. The mixture is heated at reflux for 3 hours, poured into water and extracted with ether. After removal of the ether, the solid residue is recrystallized from n-hexane. The yield of desired product is 13.5 g. (85%); M.P. 56–57°.

*Analysis.*—Calc.: N=22.20; S=10.16. Found: N=21.81; S=9.95.

EXAMPLE V

*2-octylthio-4,6-bis(5-butoxyamylamino)-s-triazine*

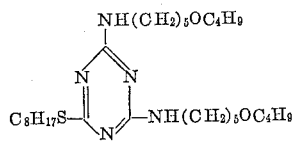

This compound is prepared by the procedure given in Example IV from 1.6 g. of sodium, 100 ml. of ethanol, 14.6 g. (0.1 mole) of octylmercaptan and 21.5 g. (0.05 mole) of 2-chloro-4,6-bis(5 - n-butoxyamylamino)-s-triazine.

EXAMPLE VI

*2-butylthio-4,6-bis(6-octoxyhexylamino)-s-triazine*

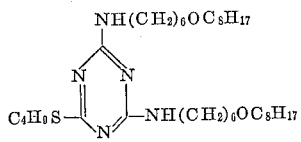

This compound is prepared by the procedure given in Example IV from 1.6 g. of sodium, 100 ml. of ethanol, 9.0 g. (0.1 mole) of butyl mercaptan and 28.5 g. (0.05 mole) of 2-chloro-4,6-bis(6 - octoxyhexylamino) - s-triazine.

EXAMPLE VII

*2-methoxy-4,6-bis(3-octylthiopropylamino)-s-triazine*

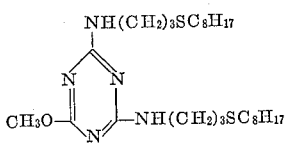

This compound is prepared according to Example III from 1.15 g. of sodium, 100 ml. of methanol and 25.9 g. (0.05 mole) of 2-chloro-4,6-bis(3-octylthiopropylamino)-s-triazine.

EXAMPLE VIII

*2-octylthio-4,6-bis(4-propylthiobutyl)-s-triazine*

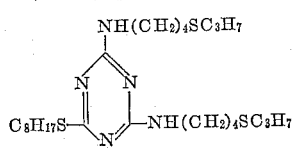

This compound is prepared according to Example IV from 1.6 g. of sodium and 100 ml. of ethanol 14.6 g. (0.1 mole) of octyl mercaptan and 20.3 g. (0.05 mole) of 2-chloro-4,6-bis(3-n-propylthiobutylamino)-s-triazine.

The contact herbicidal activity of the new compounds of this invention, particularly with respect to the control of undesirable plants or weeds, is well illustrated by the following experiments made on various plants. A number of flats were prepared containing 21 day old specimens of various grasses and broadleaf plants. The new compounds of this invention were either dissolved in a suitable solvent and sprayed onto the plants, or were applied to the plants in a solution of a wettable dust base consisting of a wetting agent and some diluent like a clay plus an amount of water to give it the desired fluidity for spraying. Fourteen days after application of a compound of this invention to the plants, the condition of each of the plants was noted. The results thereof are set forth in Tables II through VII which follow. The concentrations of herbicide to solvent or diluent were always applied in the same volume such that percent concentrations were equal to pounds of herbicide per acre as follows:

TABLE I.—CONVERSION VALUES

| Percent Concentration (Herbicide to diluent or solvent) | Pounds of Herbicide per Acre |
|---|---|
| 0.5 | 9 |
| 0.2 | 3.6 |
| 0.1 | 1.8 |
| 0.05 | .9 |
| 0.04 | .72 |
| 0.02 | .36 |
| 0.01 | .18 |

TABLE II.—PHYTOTOXICITY OF 2-METHOXY-4,6-BIS-(3-METHOXYPROPYLAMINO)-s-TRIAZINE (A) APPLIED TO PLANT FOLIAGE

| Plant | Percent Concentration of Compound A | | |
|---|---|---|---|
| | 0.1 | 0.05 | 0.01 |
| Grass | S | S | M |
| Bean | S | M | SL |
| Broadleaf | D | S | S |
| Corn | SL | None | None. |
| Cotton | D | (*) | S |
| Beet | D | (*) | S |
| Radish | D | (*) | S |
| Wild Buckwheat | D | (*) | D |
| Rye Grass | D | (*) | M |
| Wild Oats | D | (*) | S |
| Crab Grass | M | (*) | SL |
| Morning Glory | D | (*) | S |

Legend: S—severe; SL—slight; D—dead; M—moderate; (*)—not tested.

TABLE III.—PHYTOTOXICITY OF 2-BUTOXY-4,6-BIS-(3-METHOXYPROPYLAMINO)-s-TRIAZINE (B) APPLIED TO PLANT FOLIAGE

| Plant | Percent Concentration of Compound B | | |
|---|---|---|---|
| | 0.50 | 0.20 | 0.05 |
| Grass | M | S | S |
| Bean | M | S | M |
| Broadleaf | S | D | S |
| Corn | None | S | M |
| Beet | S | (*) | (*) |
| Radish | S | (*) | (*) |
| Wild Buckwheat | D | D | D |
| Rye Grass | SL | M | SL |
| Wild Oats | M | D | S |
| Crab Grass | M | D | S |
| Morning Glory | D | D | S |

Legend: S—severe; SL—slight; M—moderate; (*)—not tested.

TABLE IV.—PHYTOTOXICITY OF 2-METHOXY-4,6-BIS(3-n-BUTOXYPROPYLAMINO)-s-TRIAZINE (C) APPLIED TO PLANT FOLIAGE

| Plant | Percent Concentration of Compound C | | |
|---|---|---|---|
| | 0.50 | 0.20 | 0.05 |
| Grass | D | M | None |
| Bean | S | S | M |
| Broadleaf | D | D | M |
| Corn | (*) | None | (*) |
| Rye Grass | (*) | None | (*) |
| Wild Oats | (*) | D | (*) |

Legend: S—severe; SL—slight; D—dead; M—moderate; (*)—not tested.

TABLE V.—PHYTOTOXICITY OF 2-ETHYLTHIO-4,6-BIS(3-METHOXYPROPYLAMINO)-s-TRIAZINE (D) APPLIED TO PLANT FOLIAGE

| Plant | Percent Concentration of Compound D | | | | | |
|---|---|---|---|---|---|---|
| | 0.50 | 0.20 | 0.05 | 0.04 | 0.02 | 0.01 |
| Grass | D | D | D | S | M | None |
| Bean | D | D | D | M | M | None |
| Broadleaf | D | D | D | D | D | S |
| Corn | (*) | SL | None | None | None | M |
| Rye Grass | (*) | (*) | (*) | M | (*) | (*) |
| Wild Oats | (*) | (*) | (*) | SL | (*) | (*) |
| Crab Grass | (*) | (*) | (*) | D | (*) | (*) |
| Morning Glory | (*) | (*) | (*) | (*) | (*) | S |

Legend: S—severe; SL—slight; D—dead; M—moderate; (*)—not tested.

TABLE VI.—PHYTOTOXICITY OF 2-METHYLTHIO-4,6-BIS(3-METHOXYPROPYLAMINO)-s-TRIAZINE (E) APPLIED TO PLANT FOLIAGE

| Plant | Percent Concentration of Compound E | | | |
|---|---|---|---|---|
| | 0.5 | 0.2 | 0.05 | 0.01 |
| Grasses [1] | D | D | S | SL |
| Broadleaf Plants [2] | D | D | D | SL |

Legend: S—severe; SL—slight; D—dead.
[1] Includes wild oats, rye grass, crab grass, barnyard grass, and brome grass.
[2] Includes radish, sugar beet, pigweed, tomato, wild buckwheat, and morning glory.

TABLE VII.—PHYTOTOXICITY OF 2-METHYLTHIO-4,6-BIS(4-n-BUTOXYPROPYLAMINO)-s-TRIAZINE (F) APPLIED TO PLANT FOLIAGE

| Plant | Percent Concentration of Compound F | | | |
|---|---|---|---|---|
| | 0.5 | 0.2 | 0.05 | 0.01 |
| Grasses [1] | S | S | SL | None |
| Broadleaf Plants [2] | D | D | D | None |

Legend: S—severe; SL—slight; D—dead.
[1] Includes wild oats, rye grass, barnyard grass, and brome grass.
[2] Includes radish, sugar beet, pigweed, tomato, wild buckwheat, and morning glory.

For each test flat represented by Tables II through VII there were also prepared control flats which were not sprayed with the compounds of this invention. At the end of 14 days, the condition of the plants was noted and in all instances the plants were observed to hape shown continued growth and development.

From the above tables it will be apparent that the herbicidal compounds of this invention are effective over a wide range of concentrations including 0.5 percent which represents an application of 9 pounds/acre of active ingredient, to as little as 0.01 percent which represents an application of 0.18 pound/acre of active ingredient, in some instances. Although greater concentrations up to and including one percent and even five percent may be used, the preferred range is from 0.5 to 0.1 percent. It is also apparent that stable higher concentrations up to 80–90% of the new triazine compounds of this invention may also be formulated for purposes of preparing lesser concentrations or to facilitate storage and handling.

The criticality of the substituents present on the triazine nucleus as determining herbicidal activity is clearly evidenced by the following table. For example 2-methoxy-4,6 - bis(3 - methoxypropylamino)-s-triazine is an active herbicidal (see Table II above). If the methyl group at the 2-position on the triazine nucleus is replaced by either a hydrogen or sodium, for example, the herbicidal activity disappears as shown in Table VIII below.

TABLE VIII.—NON-PHYTOTOXICITY 2-HYDROXY-4,6-BIS(3-METHOXYPROPYLAMINO)-s-TRIAZINE (X) AND THE Na SALT THEREOF (Y) TOWARD PLANT FOLIAGE

| Plant | Compound X, 0.50% Concen. | Compound Y, 0.50% Concen. |
|---|---|---|
| Grasses [1] | None | None |
| Bean | None | None |
| Broadleaf Plants [2] | None | None |

[1] Includes wild oats, rye grass, barnyard grass and sorghum.
[2] Includes radish, sugar beet, pigweed, tomato, wild buckwheat, and morning glory.

It is to be noted that the above examples are merely illustrative, and according to this invention herbicidal compositions are contemplated such as dusts, dispersions, and emulsions which comprise one or more of the new compounds of this invention in association with one or more solid or liquid diluents of the types commonly used in herbicidal compositions. In addition these herbicidal compositions may contain one or more materials known to be active as fertilizers, soil conditioners, or plant growth regulators.

Examples of typical herbicidal compositions according to this invention are:

(a) Wettable powders comprising the s-triazine compounds of this invention as the active material dispersed in a concentration up to 90 percent water in an inert absorbent carrier such as a siliceous earth together with a wetting and/or dispersing agent such as an alkali metal salt of a long aliphatic sulphate chain, a partly neutralized sulphuric acid derivative of either a petroleum oil or of natural occurring glycerides, and a condensation product of an alkylene oxide with an organic acid.

(b) Self-emulsifying concentrates comprising the active material in solution in the desired concentration in a suitable organic solvent such as dioxane, acetone, naphtha, and the like plus a suitable wetting agent.

(c) Dusts obtained by dispersing the s-triazines of this invention as the active material in an inert absorbent carrier in combination with one or more inert carriers such as talc, diatomaceous earths, wood flours, and clays.

(d) Compositions of the s-triazines of this invention as the active material formulated in the manner commonly employed in the art for the preparation of herbicidal smokes, dusts, and aerosols.

(e) Concentrates of the s-triazines with wetting agents in which the latter compounds represent from 0.05% to 10% of the entire concentrate. In general concentrations of from 0.5 to 5% are preferred. These wetting agents are surface active in nature and serve to provide uniform dispersions of the s-triazines when later diluted in either a liquid or solid medium. These wetting agents may be anionic, cationic, or non-ionic types and include conventional soaps, such as the water-soluble salts of long chain carboxylic acids, the amino soaps such as the amine salts of long chain carboxylic acids, the sulfonated animal, vegetable, and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having hydrophilic and hydrophobic functions so as to enable the mixing of otherwise imiscible ingredients.

In addition it is evident that various modifications may be made without departing from the scope of this invention by one skilled in the art with respect to the herbicidal formulations containing these s-triazines and in the method of making the new s-triazines of this invention.

While this invention has been described with respect to certain embodiments, it is not so limited and it is to be understood that variations and modifications thereof, obvious to those skilled in the art may be made without departing from the spirit or scope of this invention.

What is claimed is:

1. A compound of the formula

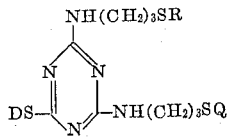

where D, R and Q are alkyl groups of 1 to 8 carbon atoms.

2. A compound of the formula

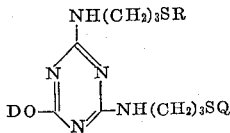

where D, R and Q are alkyl groups of 1 to 8 carbon atoms.

References Cited by the Examiner

UNITED STATES PATENTS

| | | | |
|---|---|---|---|
| 2,420,157 | 5/1947 | West | 260—249.6 X |
| 2,426,770 | 9/1947 | Grim | 260—249.6 X |
| 2,448,338 | 8/1948 | Widmer et al. | 260—21 |
| 2,654,720 | 10/1953 | Cohen et al. | 260—29.4 |
| 2,763,649 | 9/1956 | Albrecht et al. | 260—249.8 |
| 2,780,623 | 2/1957 | Welcher et al. | 260—249.8 |
| 2,820,033 | 1/1958 | Kaiser et al. | 260—249.8 |
| 2,864,682 | 12/1958 | Speziale et al. | 71—2.5 |
| 2,885,387 | 5/1959 | Stallman et al. | 260—89.1 |
| 2,891,855 | 6/1959 | Gysin et al. | 71—2.5 |
| 2,959,519 | 11/1960 | Speziale et al. | 260—249.8 X |
| 3,022,150 | 2/1962 | Weed | 71—2.5 |
| 3,037,853 | 6/1962 | Luckenbaugh | 71—2.5 |
| 3,185,561 | 5/1965 | Acker | 260—249.8 X |

FOREIGN PATENTS

| | | |
|---|---|---|
| 565,827 | 4/1958 | Belgium. |
| 456,843 | 5/1949 | Canada. |
| 880,433 | 12/1942 | France. |
| 890,760 | 11/1943 | France. |
| 1,135,848 | 12/1956 | France. |
| 541,027 | 11/1941 | Great Britain. |
| 222,719 | 11/1942 | Switzerland. |
| 337,019 | 4/1959 | Switzerland. |

OTHER REFERENCES

Controulis et al.: Journ. of the Am. Chem. Soc., vol. 67, pp. 1946 to 1948 (1945).

WALTER A. MODANCE, *Primary Examiner.*

IRVING MARCUS, DUVAL T. McCUTCHEN,
*Examiners.*

JOHN D. RANDOLPH, *Assistant Examiner.*